May 14, 1963    R. GOTTSCHALD ET AL    3,089,718
BALL JOINT
Filed Jan. 8, 1960    2 Sheets-Sheet 1

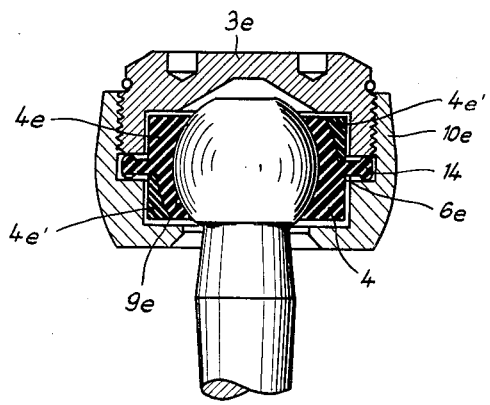
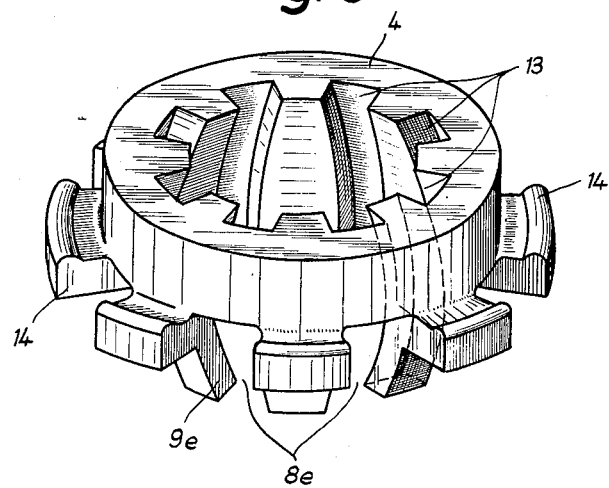

United States Patent Office 3,089,718
Patented May 14, 1963

3,089,718
BALL JOINT
Rudolf Gottschald, Osterath, and Wolfgang Scheerer, Dusseldorf, Germany, assignors to A. Ehrenreich & Cie., Dusseldorf-Oberkassel, Germany
Filed Jan. 8, 1960, Ser. No. 1,279
Claims priority, application Germany Jan. 9, 1959
5 Claims. (Cl. 287—90)

The present invention relates to a ball joint which is substantially axially loaded, as for instance a supporting joint for individually supported motor vehicle wheels.

In order to compensate for the play prevailing in the ball joint or occurring therein in the course of its life, it is necessary that a possibility exists for readjusting the ball joint, or a spring has to be provided which continuously loads the ball head. A readjustment is an undesired operation which has to be repeated periodically during the life of the joint and depends on the diligence and skill employed by the respective operator or service man. The employment of a spring enlarges the joint and increases the cost thereof, in other words, likewise presents no satisfactory solution for the manufacture of a play-free joint.

It is, therefore, an object of the present invention to provide a ball joint which will be play-free regardless of the original fit and operation and the later wear.

It is another object of this invention to provide a ball joint of the type set forth in the preceding paragraph, which will always have a certain predetermined torque regardless of the wheel load resting on the ball joint.

These and other objects and advantages of the invention will appear more clearly from the following specification in connection with the accompanying drawings, in which:

FIG. 5 represents a vertical section through an upright supporting joint with two sockets.

FIG. 6 is a perspective view of a socket according to the invention.

A ball joint comprising a ball stud, a housing and at least one bearing socket resting thereon and almost entirely surrounding the ball head is, in conformity with the present invention, characterized by the following features:

(a) The bearing socket has within the range of its equatorial section a collar which rests the socket against a corresponding step in the housing.

(b) The socket has radial slits which start from the non-loaded side of the socket and extend just through the collar.

(c) At the loaded side of the ball socket between the latter and the housing there is preferably provided a chamber for permitting an axial movement of the socket.

Figure 1:
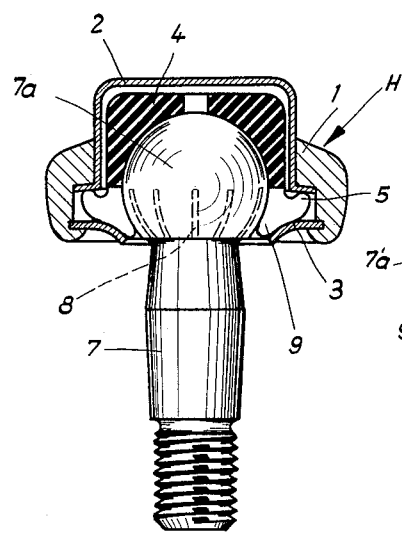
FIG. 1 represents a vertical section through an upright supporting joint with a bearing socket of synthetic material.

Referring now to the drawings in detail and FIG. 1 thereof in particular, the ball housing generally designated H comprises a housing ring 1, an inserted housing cup 2, for instance of sheet metal, and a lid 3 rolled into the housing ring 1. Within the housing H and, more specifically, within the cup 2, there is arranged a bearing socket 4 of thermoplastic synthetic material, as for instance polyamide, which is provided with a collar 5 resting on a corresponding shoulder 6 of cup 2. The ball stud 7 with its ball head 7a rests in the bearing socket 4 which latter has its collar 5 provided with radial slits 8. In this way, resilient tongues 9 are formed which, when the joint is under load, will due to the deformation of the collar 5 be pressed firmly against the ball head 7a. The pressure will be dependent on the respective load on the joint. The relationship between the load on the joint and the pressure at which the tongues 9 will be pressed against the ball head 7a may be varied at random in conformity with the width of the collar 5.

A ball joint of this type will operate as follows: The load rests on the slit-free side of the bearing socket which latter through its collar 5 rests on the housing H. Due to the load, said collar slightly deforms and presses each of the tongues 9 against that side of the ball head which is not under load, i.e. in this instance against that side of the ball head which is adjacent the ball stud 7. The pressure exerted upon said tongues is dependent on the axial load on the joint. In view of the load, the entire socket deviates in axial direction to the same extent by which the slit collar will deform. This deviating movement has the additional advantage that hard shocks upon the joint will be resiliently absorbed. The socket may consist of metal or synthetic material, or may also be composed of two parts. This means that for instance a steel socket could at least on the pressure side thereof be lined with a synthetic material.

Figure 2:
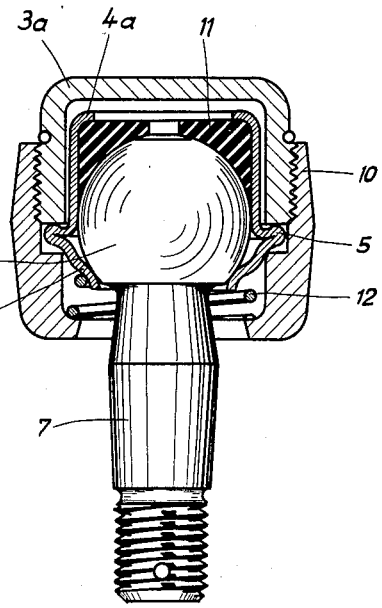
FIG. 2 is a vertical section through a supporting joint according to the invention with a bearing socket of steel.

Thus, according to FIG. 2, the joint comprises a housing 10 with a housing lid 3a screwed into the housing 10. The bearing socket 4a consists of steel and has a lining 11 of thermoplastic synthetic material. The lower portion of bearing socket 4a has resilient tongues 9a which are additionally pressed against ball head 7a by means of a spring 12.

Figure 3:
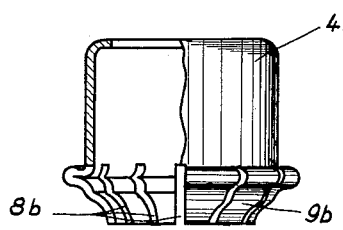
FIG. 3 illustrates partly in view and partly in section a bearing socket for receiving a lining of synthetic material.

FIG. 3 illustrates the ball cup 4a of FIG. 2 by itself with slits 8b and resilient tongues 9a between which the ball head is to be inserted.

Figure 4:
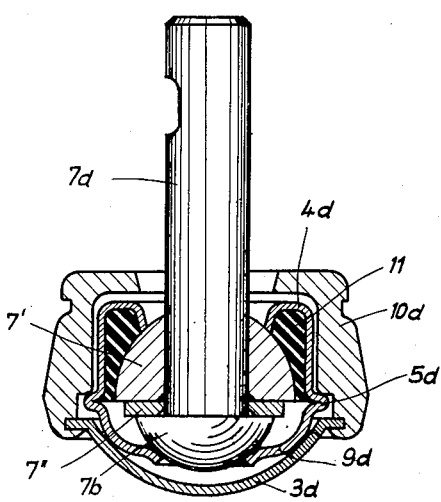
FIG. 4 is a vertical section through a suspended supporting joint with a bearing socket of steel and a lining of synthetic material.

According to the supporting joint of FIG. 4, a composite ball stud and head is employed comprising the stud proper 7d with the head portion 7b, an intermediate disc 7" and a calotte or spherical section 7'. With such a joint, the rotative movement proper occurs between the members 7' and 7b, whereas the angular movement occurs between the spherical section 7' and the lining 11 of thermoplastic synthetic material of the bearing socket 4d. The power flow is then effected through the stud 7d to the spherical section 7' and from there through the lining 11 of socket 4d to collar 5d thereof and from there to the housing 10d. The effect of the collar 5d and the resilient tongues 9d is the same as described above in connection with FIGS. 1 and 2. A continuous pressure of the tongues upon the ball head will be maintained, even if the joint is under no load, due to the fact that the tongues 9d are arched and rest elastically against lid 3d of the housing.

It is also possible so to design the bearing socket that the slits are somewhat wider than the tongues therebetween. In such an instance, two of such bearing cups may be placed over the ball head so as to face each other. One cup will then hold the ball stud in a play-free manner when the load acts in one direction, whereas the other socket will be effective for the load acting in the opposite direction. A ball joint construction of this type is shown in FIG. 5 and comprises the two sockets 4e, 4e' which may advantageously consist of a thermoplastic synthetic material, as for instance polyamide. The slits 8e (see FIG. 6) are wider than the resilient tongues 9e and continue upwardly as grooves 13. In this way, two similar sockets are passed over the ball head so as to face each other.

The operation of a joint according to FIG. 5 will be as follows: When the joint is under load, the ears 14 which have been formed by the slits 8e in the collar rest upon the housing lid 3e and thus press the tongues 9e from below against the ball head. When a pull acts upon the joint, the second socket 4e', which is only partially visible, will become effective. It will rest against the housing step 6e and will be effective similar to cup 4e but in reversed direction.

By screwing the lid 3a into the housing 10e to a more or less extent, the operational fitting of the joint may be affected for the joint under no load. The joint according to the invention will remain absolutely play-free in any direction of load.

It will be evident from the above that the construction and design of the bearing socket in conformity with the present invention will assure that the ball stud will always be held in the housing in the proper manner. An occurrence of play will be safely avoided, even after a long time of operation of the joint.

It is, of course, to be understood that the present invention is, by no means, limited to the particular constructions shown in the drawings but also comprises any modifications within the scope of the appended claims.

What we claim is:

1. A ball joint, especially a supporting joint for individually suspended wheels of motor vehicles, which comprises: a stud, a ball head connected to said stud, a housing extending around said ball head and having an inwardly opening annular groove near the equatorial zone of said ball head, and at least one ball socket located within said housing and surrounding a major portion of said ball head, said socket having a circumferential collar protruding radially outwardly beyond the outer contour of the remainder of said socket means and resting in said annular groove, said socket also being provided with a plurality of radial slits extending from that side of said socket which is remote from the load receiving side thereof through said collar, said socket and said housing confining with each other a chamber located at the loaded side of said ball socket to provide space for axial movement of said socket, said collar being resilient in the axial direction to permit axial movement of the socket under axial load.

2. A ball joint, especially a supporting joint for individually suspended wheels of motor vehicles, which comprises: a stud, a ball head connected to said stud, housing means having an inner cylindrical surface with a radially extending groove open toward the interior of said housing means and located near the equatorial zone of said ball head, axially resilient socket means arranged within said housing means so as to permit axial movement of said socket means relative to said housing means, one side of said socket means being the loaded side thereof, said socket means and said housing means confining with each other a chamber located at the loaded side of said socket means and providing space for said axial movement of said socket means, said socket means having an outer cylindrical surface normally spaced from said inner cylindrical surface of said housing means, said socket means elastically surrounding the major portion of said ball head and having a radially outwardly extending, axially resilient collar spaced from the ends of said socket means and extending into said groove and engaged by the loaded sidewall of said groove to permit axial movement under load, that end portion of said socket means which is opposite said loaded side tapering from said collar toward the axis of said socket means in a direction away from said loaded side and being provided with spaced circumferentially substantially uniformly distributed axial slits extending through said collar and through all of said tapering end portion thereby providing a plurality of circumferentially uniformly distributed tongues for elastic engagement with adjacent portions of said ball head.

3. A ball joint according to claim 2, in which said ball head is composed of two spherical sections and a plate intermediate said spherical sections.

4. A ball joint according to claim 2, in which said slits are wider than said tongues.

5. A ball joint according to claim 2, in which said socket means is composed of two sections spaced from the ball head so as to face each other while the tongues of one section engage the slits of the other section and while the tongues of the other section engage the slits of said one section.

References Cited in the file of this patent

UNITED STATES PATENTS

| | | |
|---|---|---|
| 2,740,649 | Latzen | Apr. 3, 1956 |
| 2,749,161 | Latzen | June 5, 1956 |
| 2,845,290 | Latzen | July 29, 1958 |
| 2,873,130 | Moskovitz | Feb. 10, 1959 |
| 2,919,150 | Baker | Dec. 29, 1959 |
| 2,932,534 | Williams | Apr. 12, 1960 |